Patented May 9, 1950

2,507,128

UNITED STATES PATENT OFFICE 2,507,128

ANTIPERSPIRANT COMPOSITION

Eugene Wainer, Niagara Falls, N. Y., assignor, by mesne assignments, to National Lead Company, New York, N. Y., a corporation of New Jersey No Drawing. Application December 14, 1946, Serial No. 716,444

3 Claims. (Cl. 167—90)

The present invention relates to deodorant compositions containing zirconium compounds and more particularly to deodorants and antiperspirants containing zirconium carbonate.

It has been suggested to employ certain derivatives of zirconium and particularly salts of zirconium with organic acids as antiperspirants. This important property of salts of zirconium and organic acids as, for instance, the neutral alkali zirconium derivatives of alphahydroxy organic acids such as sodium zirconium lactate, is described with more particularity in an application of Henry L. Van Mater filed January 18, 1946, under Serial No. 642,107, now Patent No. 2,498,514.

Although such compounds are not irritating to the human skin when employed as antiperspirants and deodorants, hereinafter called deodorants, they apparently act disadvantageously in the usual creams and emulsions in which they are incorporated. These creams invariably contain fatty materials such as stearic acid and, in addition, contain an emulsifying agent as, for instance, soluble soda or potash soaps as well as organic soaps or materials such as triethanolamine for the purpose of emulsification. In addition, the compounds contain humectants such as glycerine or one of the glycols.

The compounds of zirconium heretofore proposed for incorporation in creams for application to the human skin as a deodorant being salts, (first) tend to produce the ordinary "salting out" effect tending to break or separate the emulsion in a manner possessed by most electrolytes and (second) tend to react or combine with the emulsifying agent and thus also destroy the emulsion. By reason of these two adverse actions only relatively small amounts of the zirconium compound could be incorporated with the usual cosmetic bases and thus the deodorant action of zirconium compounds could be only partially neutralized since the applicator would apply only that amount of cream or cosmetic grease which could either be absorbed by the skin or which would not be unsightly or uncomfortable. Although all of these difficulties can be eliminated by employing the hydroxy acid salt directly and without a carrying base of cosmetic grease or cream, such application is objected to because prior practice in the use of such materials dictates the employment of a vanishing type cream base absorbable to a relatively high degree by the human skin. Attempts to incorporate excessive amounts of zirconium salts in such types of cosmetic bases result merely in the breaking of the emulsion after a short period of time with the production of an unsightly and unusable product.

It is an object of the present invention to prepare deodorant compositions comprising cosmetic bases and creams and a zirconium carbonate, which unctuous compositions are not irritating to the human skin and which contain relatively large proportions of the active deodorant ingredient without producing separation or breaking of the cosmetic dispersion.

In accordance with the present invention it has been found that the freshly precipitated carbonate of zirconia is a highly reactive and useful material as a deodorant for application to the human skin. As normally prepared, the carbonate of zirconia is generally somewhat mildly acid in its nature although it contains the carbonate radical; the pH of the product is normally pH 5.5 to pH 6.5 and, in water paste form, may be applied directly to the skin without irritation and with beneficial results as a deodorant and antiperspirant. The freshly precipitated zirconium carbonate is generally in gel form and is particularly reactive with those bases and with very weak acids, including the products of decomposition of perspiration, which are considered the cause of most so-called body odors. The odors of such acids and bases and their decomposition products are eliminated apparently by virtue of such reactions with the production of odorless chemical compounds with the hydrous zirconium carbonate, or by reason of the fact that this particular compound can be produced in gel form and in such form is an extremely powerful adsorber of the type of material exuded from the human skin. This particular property of hydrous zirconium carbonate gel combined with the fact that it appears not to react adversely upon emulsified cosmetic creams and greases, the so-called cosmetic bases, makes it an extraordinary deodorizing material.

In the practice of the invention, creams of the vanishing type are generally employed though properly compounded grease base creams may also be used. In the compounding of such creams it is recommended that a grade of stearic acid equivalent to U. S. P. or the commercial type called triple pressed be used. The stearic acid is emulsified with alkalies such as NaOH or KOH, or with organic emulsifiers such as triethanolamine or morpholine. Strictly speaking, the emulsifying agent is the soap formed as a result of the reaction of the organic or inorganic alkali and stearic acid, said emulsifying agent dispersing the free stearic acid in proper and stable form. In addition, a humectant such as glycerine or ethylene glycol for moisture retention purposes is generally added so as to provide a base having a long reaction time. While such compositions as above are of the vanishing type base and as such are relatively well known, any one of a number of grease type bases may be used in this connection. Typical of such compositions are combinations of petrolatum, beeswax, and borax. They may contain spermaceti or mineral oil or both. Using zirconium carbonate gel, stable high concentration creams of the grease type are easily prepared.

Zirconium carbonate gel is made by reacting solutions of salts of zirconium, such as the chloride or sulfate, with solutions of alkali carbonates such as sodium, potassium, or ammonium. Precipitation is quantitative at pH 3.5 to 7. The flocculent precipitate is filtered and washed till a pH of 5.5 to 6.5 is obtained in the cake, and excess water is then airblown out of the cake. The cake will generally contain an equivalent of 18 to 20 per cent zirconium dioxide by weight.

The zirconium carbonate gel is generally added to the cream base as a water dispersion. The freshly precipitated gel is mixed with one-half to one-third its weight of water and then ground in a pebble mill for several minutes. A smooth dispersion is obtained. Sometimes extremely high concentrations of zirconia compounds are desired. In these cases the cake is used directly and dispersion is obtained by repeated treatment of the total composition in a colloid or homogenizing mill.

The above described bases are usually creams. By variation in the amount of water these may be changed from relatively stiff products to easily pourable liquids.

Using zirconium carbonate gel, concentrations of the gel up to 30% are easily obtained in these creams and concentrations of 40% may be obtained with production of a stable cosmetic.

The following examples are purely illustrative of the invention as many variations can be made in the ingredients and the proportions thereof.

*Example I*

151 grams of U. S. P. lump stearic acid is melted on the steam bath after which the temperature of the molten stearic acid is carefully raised to 90° C. In a separate container a mixture of 21 grams of KOH, 26 grams of glycerine, and 340 cc. of water are carefully heated to 90° C.

The melted stearic acid is then added slowly and with constant stirring to the alkali-glycerine solution maintaining the temperature at 90° C. The cream is then treated in a homogenizing mill and treatment continued until the temperature has dropped to 50° C.

200 grams of zirconium carbonate gel containing the equivalent of 18% $ZrO_2$ is triturated or ground with 150 cc. of water until thoroughly dispersed and then added slowly to the mixture in the homogenizer. The homogenizing action is continued until the mixture is perfectly smooth after which time the cream is poured. A smooth cream is obtained containing the equivalent of about 22% zirconium carbonate gel. By adding the zirconium carbonate gel directly to the homogenizer without water dilution, and in appropriate quantity (roughly 350 to 375 grams for the above batch) creams containing about 40% carbonate gel are readily prepared.

*Example II*

100 grams of 60° C. (melting point) paraffin wax are melted on 150 cc. of hot water; after the paraffin has fused 20 grams of stearic acid are added and the heating continued until the stearic acid is also fused. Then 30 cc. of glycerine and 15 cc. of triethanolamine are added slowly with vigorous stirring and the batch allowed to cool to 50° C. A dispersion of 200 grams of zirconium carbonate gel in 100 cc. of water is added to the wax emulsion at 50° C. and the vigorous stirring continued for several minutes. On cooling to room temperature a fluid, slightly thick liquid is obtained, designated as a lotion.

*Example III*

A grease base cream may be compounded as follows:

8 parts of beeswax, 5 parts of paraffin wax 50° C. melting point, 3 parts of spermaceti, 50 parts of low viscosity mineral oil are melted together at 70° C. 0.5 part of borax and 30 parts of zirconium carbonate gel are triturated with 10 parts of water. The carbonate suspension is added slowly with vigorous stirring, after which the cream is treated in a homogenizing mill until a temperature of 45° C. is reached. The product is poured into suitable containers.

What is claimed is:

1. A composition for topical application comprising a cosmetic cream base and hydrous zirconium carbonate gel dispersed therethrough.

2. A composition for topical application comprising an emulsified cosmetic vanishing cream comprising emulsified stearic acid and hydrous zirconium carbonate gel.

3. A composition for topical application comprising an emulsified unctuous cosmetic base and hydrous zirconium carbonate having a pH of between 5.5 and 6.5 dispersed therethrough.

EUGENE WAINER.

REFERENCES CITED

The following references are of record in the file of this patent:

UNITED STATES PATENTS

| Number | Name | Date |
|---|---|---|
| 2,435,005 | Huppke | Jan. 27, 1948 |

FOREIGN PATENTS

| Number | Country | Date |
|---|---|---|
| 237,624 | Germany | Aug. 23, 1911 |

OTHER REFERENCES

De Navarre: Chemistry and Manufacture of Cosmetics (1942), pages 262, 273, 274, 275, 342.

Mellor: Inorganic and Theoretical Chemistry, vol. 7 (1927), pages 160, 161.